US009804415B2

(12) United States Patent
Stephkov et al.

(10) Patent No.: US 9,804,415 B2
(45) Date of Patent: Oct. 31, 2017

(54) SECURED DATA COMMUNICATION IN A NETWORKED COMPUTER SYSTEM FOR PROVIDING OPTICAL LENSES

(71) Applicant: ESSILOR INTERNATIONAL (COMPAGNIE GENERALE D'OPTIQUE), Charenton le Pont (FR)

(72) Inventors: Natacha Stephkov, Charenton le Pont (FR); Bernard Duverneuil, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 133 days.

(21) Appl. No.: 14/355,902

(22) PCT Filed: Oct. 31, 2012

(86) PCT No.: PCT/EP2012/071636
§ 371 (c)(1),
(2) Date: May 2, 2014

(87) PCT Pub. No.: WO2013/064582
PCT Pub. Date: May 10, 2013

(65) Prior Publication Data

US 2014/0293218 A1 Oct. 2, 2014

(30) Foreign Application Priority Data

Nov. 3, 2011 (EP) .................................... 11306420

(51) Int. Cl.
*G06F 19/00* (2011.01)
*G02C 7/02* (2006.01)
(Continued)

(52) U.S. Cl.
CPC ............. *G02C 7/027* (2013.01); *G06Q 10/06* (2013.01); *G06Q 50/04* (2013.01); *Y02P 90/30* (2015.11)

(58) Field of Classification Search
CPC combination set(s) only.
See application file for complete search history.

(56) References Cited

U.S. PATENT DOCUMENTS 6,792,401 B1 * 9/2004 Nigro .................. G02C 13/003 703/6
6,891,838 B1 * 5/2005 Petite .................. H04L 12/2825 340/870.02
(Continued)

FOREIGN PATENT DOCUMENTS

CN 1595413 3/2005
WO 01/99018 12/2001
(Continued)

OTHER PUBLICATIONS

International Search Report dated May 16, 2013, corresponding to PCT/EP2012/071636.
(Continued)

*Primary Examiner* — Kidest Bahta
(74) *Attorney, Agent, or Firm* — Young & Thompson

(57) ABSTRACT

Method of supplying an optical lens adapted to a wearer, includes:

Figure 1:
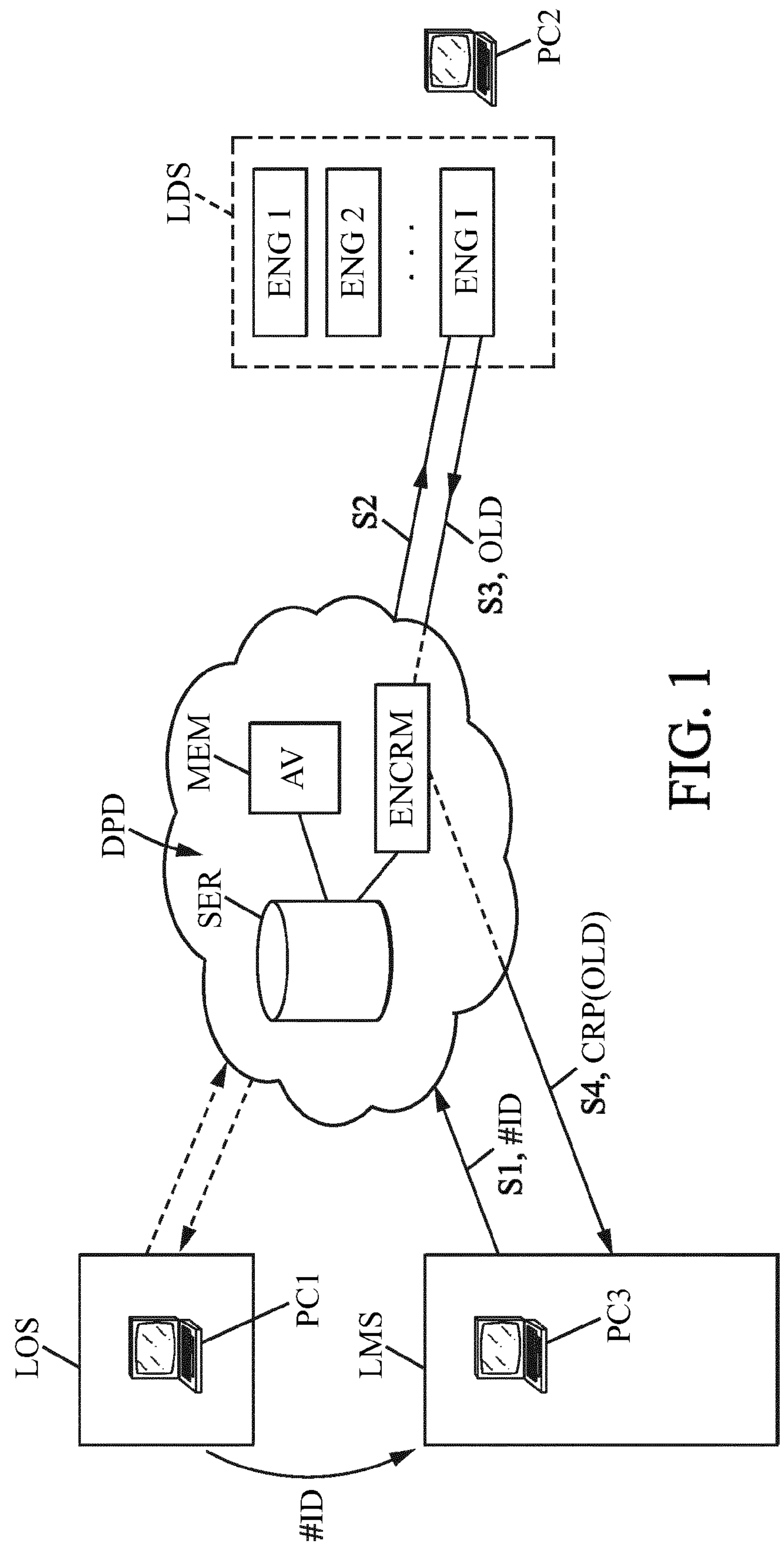

a) receiving, directly or indirectly via a manufacturing side, from a first networked computer entity located at a lens ordering side, a first set of data including at least wearer's prescription data, b) sending a second set of data including at least an optical lens design information and the wearer's prescription data to a second networked computer entity located at a lens designing side, and receiving from the second (Continued)

networked computer entity a third set of data including at least optical lens data calculated from the second set, and c) sending at least to a third networked computer entity, at a lens manufacturing side, a fourth set of data including at least part of the optical lens data, the at least optical lens data of the fourth set of data being at least partially modified by a masking function.

13 Claims, 6 Drawing Sheets

(51) Int. Cl.
*G06Q 10/06* (2012.01)
*G06Q 50/04* (2012.01)

(56) References Cited

U.S. PATENT DOCUMENTS 7,020,697 B1 3/2006 Goodman et al.
7,716,077 B1 5/2010 Mikurak
2002/0000092 A1* 1/2002 Sharood .................. F25D 29/00 62/127
2002/0069096 A1 6/2002 Lindoerfer et al.
2002/0077077 A1* 6/2002 Rezvani .................. H04L 63/08 455/410
2002/0176052 A1* 11/2002 Ueno .................. G02C 13/003 351/245
2004/0004633 A1* 1/2004 Perry ................. G06Q 30/0603 715/728
2004/0246440 A1* 12/2004 Andino ................ A61B 3/0025 351/159.74
2005/0073650 A1 4/2005 Ito
2007/0299800 A1* 12/2007 Bayoumi ........... G05B 19/4185 706/47
2010/0114780 A1 5/2010 Tribe et al.
2010/0289643 A1* 11/2010 Trundle ............... F24F 11/0086 340/545.1
2011/0320029 A1 12/2011 Buchet et al.
2012/0022985 A1 1/2012 Yoshida et al.

FOREIGN PATENT DOCUMENTS

WO 2010023941 A1 3/2010
WO 2010040757 A1 4/2010

OTHER PUBLICATIONS

Japanese Decision of Rejection, dated Dec. 5, 2016, from corresponding Japanese Patent Application No. JP 2014-539330.
Chinese Office Action dated May 26, 2016, with English Translation; Application No. 201280054173.0.

* cited by examiner (DPD)

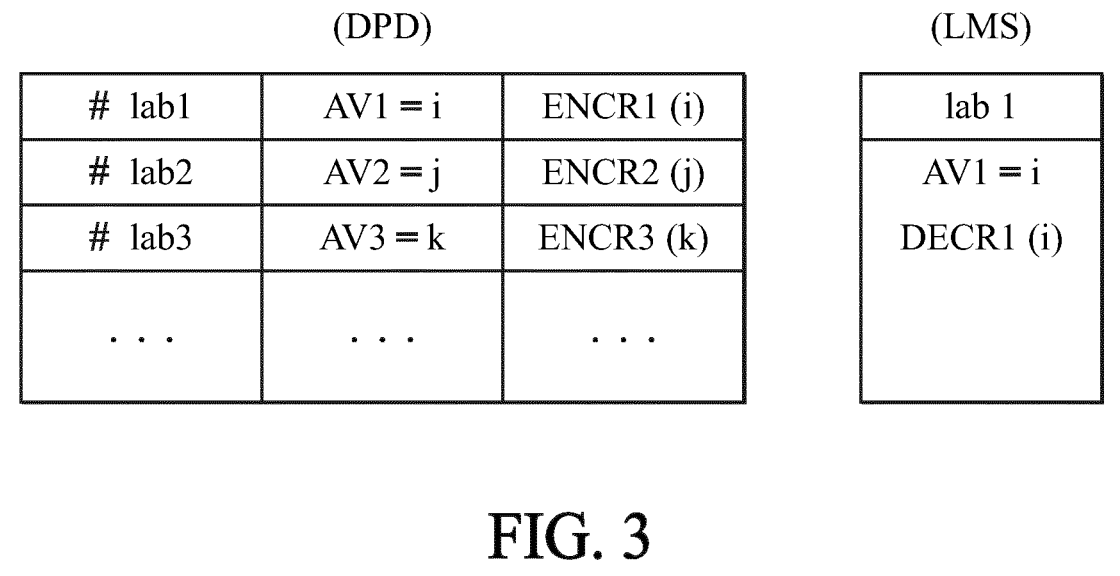

| # lab1 | AV1 = i | ENCR1 (i) |
|---|---|---|
| # lab2 | AV2 = j | ENCR2 (j) |
| # lab3 | AV3 = k | ENCR3 (k) |
| . . . | . . . | . . . |

(LMS)

| lab 1 |
|---|
| AV1 = i<br>DECR1 (i) |

FIG. 3

SECURED DATA COMMUNICATION IN A NETWORKED COMPUTER SYSTEM FOR PROVIDING OPTICAL LENSES

The present invention relates to a method implemented by computer means and a computer system for providing at least one optical lens adapted to a wearer.

Usually, an eye care professional orders, at an ordering side, an optical lens to an optical lab by sending lens ordering data. The lens ordering data generally comprise at least wearer's data (and more particularly wearer's prescription data), lens frame data and lens data. The optical lab then manufactures the optical lens based on the lens ordering data, at a lens manufacturing side.

An aim of the present invention is to improve the situation.

To that end, the present invention is related to a method implemented by computer means, for providing at least one optical lens adapted to a wearer, wherein the method comprises the steps of:

a) receiving, directly or indirectly via a manufacturing side, from a first networked computer entity located at a lens ordering side, a first set of data, the first set of data comprising at least wearer's data and in particular wearer's prescription data, b) sending a second set of data comprising at least an optical lens design information and the wearer's prescription data to a second networked computer entity located at a lens designing side, and receiving from the second networked computer entity a third set of data comprising at least optical lens data calculated from the second set, and c) sending at least to a third networked computer entity, at a lens manufacturing side, a fourth set of data comprising at least a part of the optical lens data, the at least optical lens data of the fourth set of data being at least partially modified by a masking function.

The present invention aims also at an optical lens supply system for providing at least one optical lens adapted to a wearer, comprising processing means for:

a) receiving, directly or indirectly via a manufacturing side, from a first networked computer entity located at a lens ordering side, a first set of data, the first set of data comprising at least wearer's data and in particular wearer's prescription data, b) sending a second set of data comprising at least an optical lens design information and the wearer's prescription data to a second networked computer entity located at a lens designing side, and receiving from the second networked computer entity a third set of data comprising at least optical lens data calculated from the second set, and c) sending at least to a third networked computer entity, at a lens manufacturing side, a fourth set of data comprising at least a part of the optical lens data, the at least optical lens data of the fourth set of data being at least partially modified by a masking function.

More particularly, as steps a) to c) can be performed at a same location and possibly by a same networked data-processing device, the present invention also relates to a networked data-processing device comprising processing means (for example a server, a memory unit, a processor, or other) for:

a) receiving, directly or indirectly via a manufacturing side, from a first networked computer entity located at a lens ordering side, a first set of data, the first set of data comprising at least wearer's data and in particular wearer's prescription data, b) sending a second set of data comprising at least an optical lens design information and the wearer's prescription data to a second networked computer entity located at a lens designing side, and receiving from the second networked computer entity a third set of data comprising at least optical lens data calculated from the second set, and c) sending at least to a third networked computer entity, at a lens manufacturing side, a fourth set of data comprising at least a part of the optical lens data, the at least optical lens data of the fourth set of data being at least partially modified by a masking function.

The present invention further aims at a computer program product for a data-processing device, the computer program product comprising a set of instructions which, when loaded into the data-processing device, causes the device to perform the steps of the method as presented above.

Figure 2:
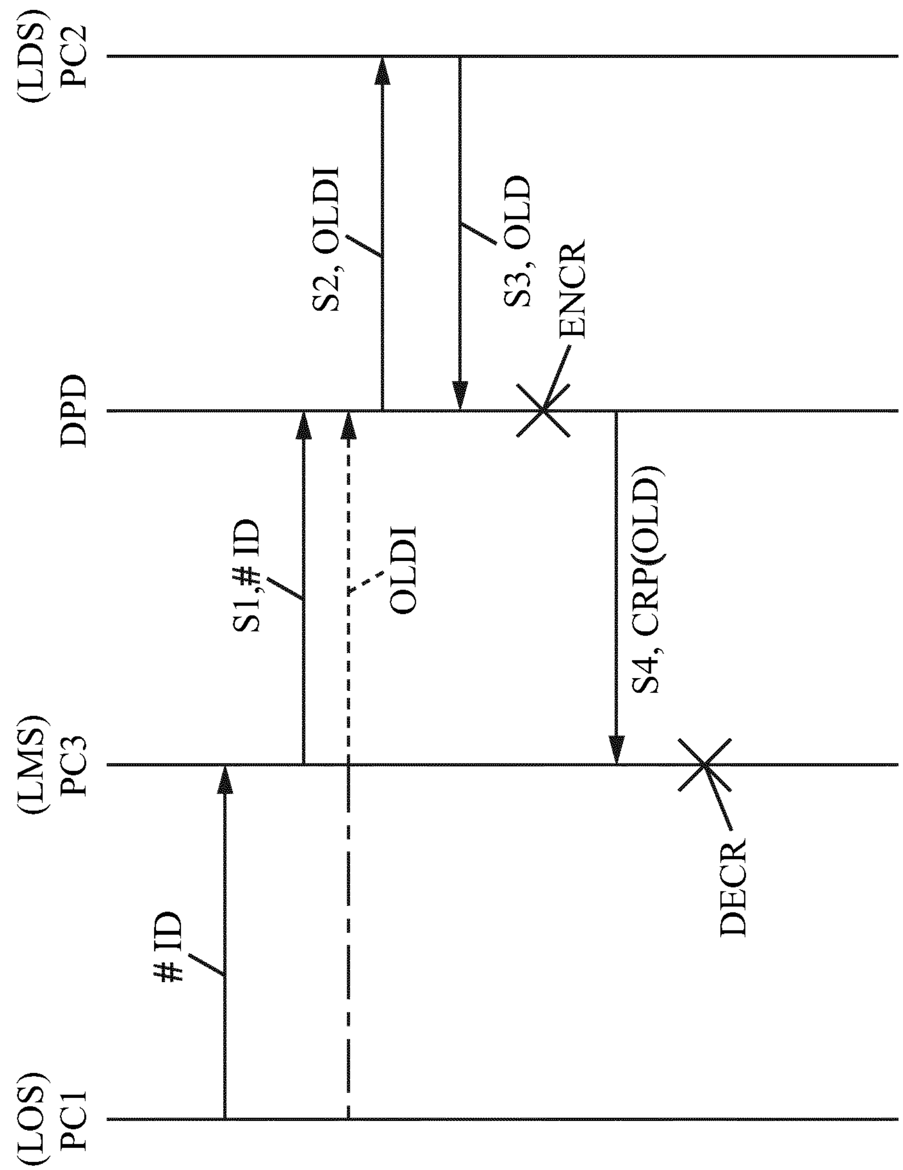
Figure 4:
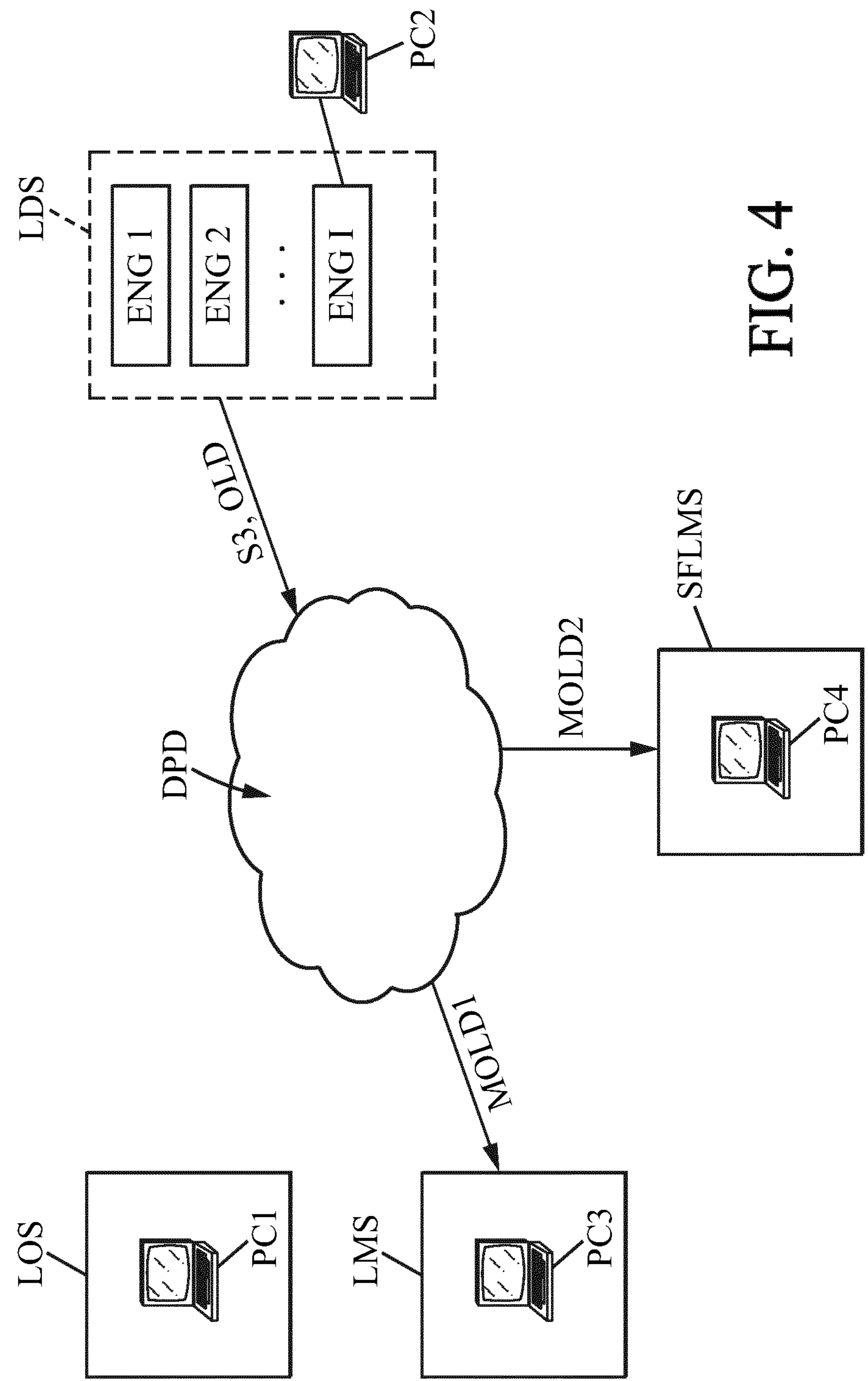
Figure 5A:
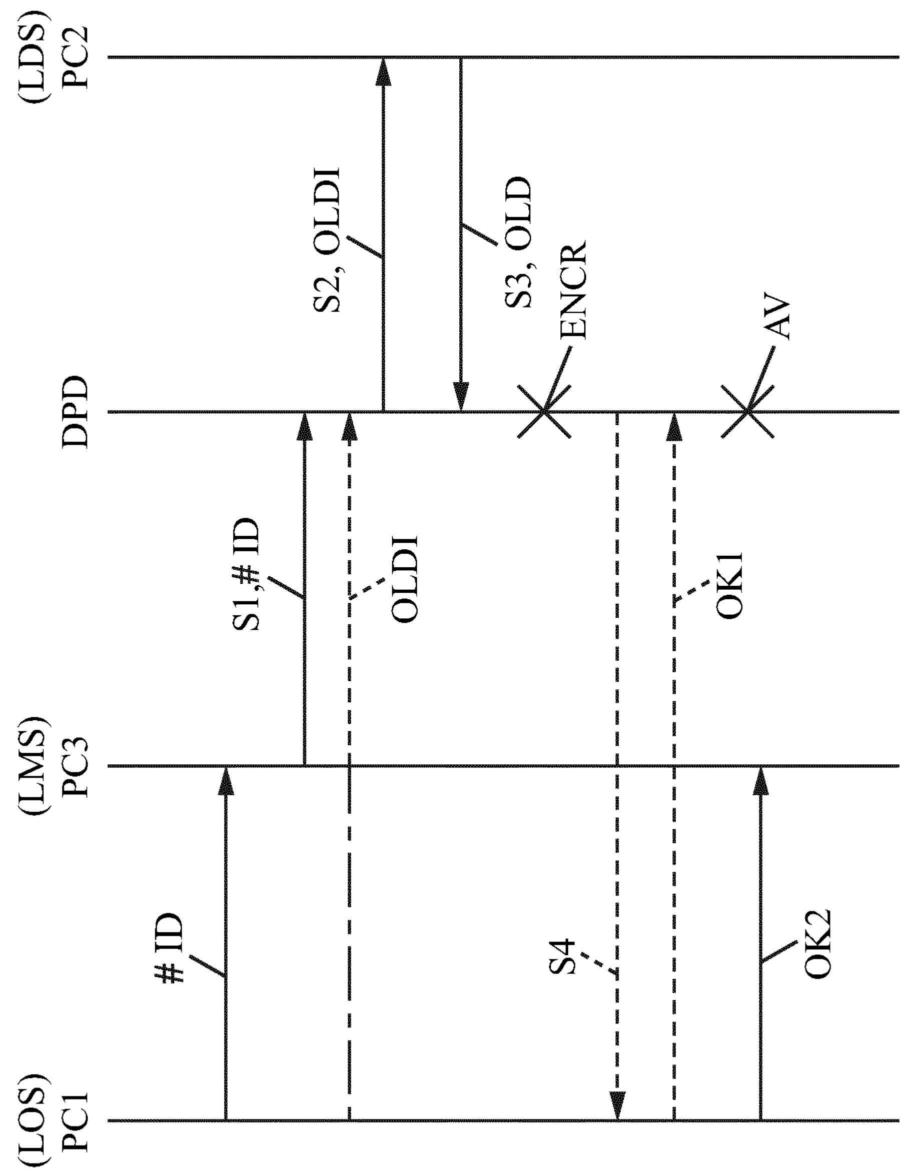
Figure 5B:
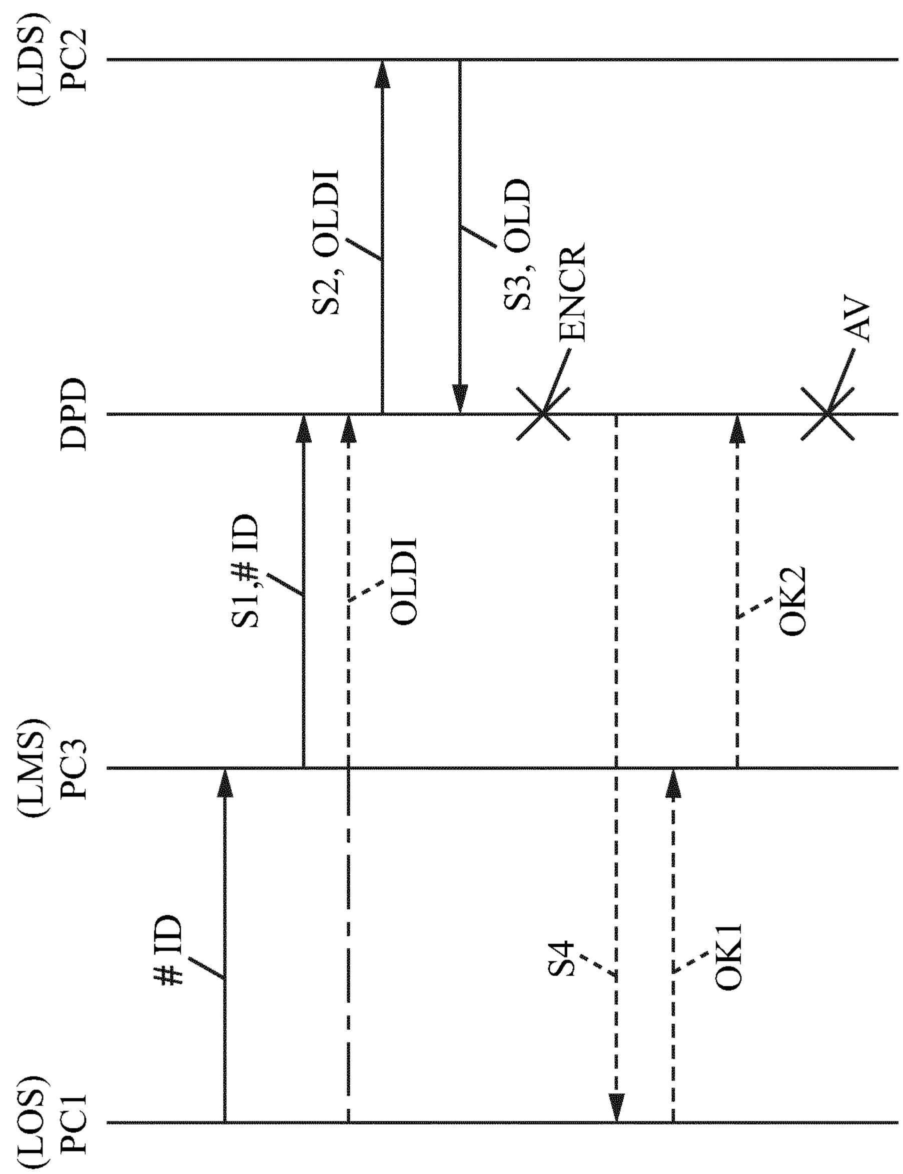

Other features and advantages of the invention will become apparent from reading the detailed description below, and studying the appended drawings in which:

FIG. 1 diagrammatically represents an example of optical lens supply system implementing the method according to the invention, FIG. 2 is a sequence diagram showing data communications between the computer entities shown in FIG. 1, FIG. 3 shows an example of a database content in a memory of a networked data-processing device according to an embodiment of the invention, and an example of a memory content in a third networked computer entity PC3, FIG. 4 diagrammatically represents an example of optical lens supply system comprising a semi-finished lens manufacturing side according to an embodiment of the invention, FIG. 5A is a sequence diagram as an alternative to FIG. 2, FIG. 5B is a sequence diagram as a further alternative to FIG. 2.

The present invention relates to a supply assisted by computer means of at least one optical lens adapted to a wearer. By "optical lens" is meant any ophthalmic lens comprising without limitation spectacle lens, contact lens, an intraocular lens and the like. The terms "adapted to a wearer" mean that the optical lens meets at least the requirements of an ophthalmic prescription of the wearer.

The system shown as an example in FIG. 1 comprises:

a first networked computer entity PC1, located at a lens ordering side LOS (for example at an eye care professional premises), at least a second networked computer entity PC2, located at a lens designing side LDS (running for example a lens design calculation engine ENG I), and a third networked computer entity PC3, located at a lens manufacturing side LMS (for example at an optical lab premises).

The system further comprises a networked data-processing device DPD including for example a server SER and a memory unit MEM, the networked data-processing device DPD being networked for enabling a communication with the first, second and third computers, as described below.

In an embodiment, each communication of optical lens data OLD from the networked data-processing device DPD to the third networked computer entity PC3 (at the lens manufacturing side LMS), can be counted by counting means so as to obtain an amount value AV (FIG. 1). An optical lens data set OLD can comprise for example data relative to the optical lens design. Therefore, the counted value AV can indicate for example a number of optical lens data sets (including lens design data) communicated to a given optical lab having the third networked computer entity PC3. Details related to the counting of such an amount value AV (schematically shown on FIG. 3) will be given below.

Referring to FIG. 2, the networked data-processing device DPD receives a first set of data S1 associated to an optical lens order. This first set of data S1 comprises at least wearer's data and in particular wearer's prescription data.

Hereafter, the "wearer's data" comprise at least wearer's prescription data (including for example spherical power, astigmatism, cylinder axis of the astigmatism, or other). The wearer's data may further comprise individual data like, for example, inter-pupillary distance, vertex distance, pantoscopic angle, or any other data related to the wearer.

This first set of data S1 can further comprise data relative to a spectacle frame intended to carry the lens. Such data can thus comprise spectacle frame information including, for example, information related to the inner rim shape of the spectacle frame intended to carry the optical lens, measurements of the rim dimensions, a tilt angle of such rims, or other. Additionally, the eye care professional can also send data related to a choice of a type of optical lens (for example, the lens optical design, the lens material, its coating, or other).

The device DPD can receive this first set S1 directly from a lens ordering side LOS, as shown with dashed line arrows in FIG. 1. In the alternative embodiment illustrated in FIG. 2, the device DPD receives the first set S1 indirectly via the lens manufacturing side LMS, through, for example, the third computer entity PC3 which can add data relative for example to machines at the manufacturing side. Such machines can include usual means at an optical lab such as a lens generator, a lens blocker, a lens polisher, and/or a lens edger, or other.

The networked data-processing device DPD then sends a second set of data S2 to the second computer entity PC2 at the lens designing side LDS. The second set of data S2 comprises at least wearer's prescription data and further includes an optical lens design information OLDI. The optical lens design information can result from a choice made by the eye care professional at the lens ordering side (LOS) and/or from the optical lab at the lens manufacturing side (LMS), during a communication between the first computer PC1 or the third computer PC3 with the device DPD (dashed line arrow of FIG. 2).

The second computer entity PC2, at the lens designing side (LDS), returns to the networked data-processing device DPD a third set of data S3 comprising at least optical lens data OLD calculated from the second set S2. The optical lens data OLD comprise data defining geometrical and optical characteristics of the optical lens to be manufactured. The networked data-processing device DPD builds then a fourth set of data S4 to send to the lens manufacturing side (LMS), and more particularly comprises means for masking at least partially the content of the fourth set S4.

The masking can comprise an encryption and, in a possible embodiment, the networked data-processing device DPD can comprise encrypting means to encrypt at least partially the content of the fourth set S4, with an encryption key ENCR. The second computer PC2, at the lens designing side (LDS), may comprise, in a variant, encryption means for carrying out this encryption.

In an alternative or complementary embodiment described below with reference to an example of embodiment shown in FIG. 4, a masking function can be applied to the optical lens data OLD, and more particularly to optical lens data relative to first and second parts of the optical lens OLD1, OLD2, so as to transmit to one or several lens manufacturing sides modified optical lens data relative to a first part of the optical lens MOLD1 and optical lens data relative to a second part of the optical lens MOLD2.

Typically, an optical lens can be defined as comprising a first part and a second part. The first part (resp. the second part) can be, for example, a first face (resp. a second face) of the optical lens. The first face (resp. the second face) can be, for example, the front surface (resp. the back surface) or the back surface (resp. the front surface) of the optical lens. More generally, the first part (resp. the second part) can correspond to a first volume (resp. a second volume) of the optical lens, corresponding to a back part (resp. the front part) and a front part (resp. the back part) of the optical lens.

The optical and geometrical properties of the first part F1 can be defined by a function EF1 $(n, x, y, z)$ where n is the optical index of the first part F1 and x,y,z are the spatial coordinate in a given coordinate system. The optical and geometrical properties of the second part F2 can be defined by a function EF2 $(n, x, y, z)$ where n is the optical index of the first part F2 and x,y,z are the spatial coordinate in a given coordinate system.

The optical function OF of an optical lens can then be defined as a function h defining the optical and geometrical properties of said optical lens, such that:

$$OF=h(EF1(n,x,y,z),EF2(n,x,y,z)).$$

where n is the optical index and x,y,z are the spatial coordinate in a given coordinate system.

The optical and geometrical characteristics of an optical lens can be defined, for example, by the surface shape of the front and back surface, the position of the back surface relative to the front surface and the optical index n of the optical lens material.

Therefore, the third data set S3 can be seen, in an embodiment of the invention, as a "virtual lens" (defined in a computer file or in a data communication message) comprising a first virtual part VF1 defined by the first equation EF1$(n,x,y,z)$ and a second virtual part VF2 defined by the second equation EF2 $(n,x,y,z)$. The equation EF1 and the equation EF2 allow then to simulate the optical function OF of the optical lens in any condition, especially when the lens is in front of the eye of the wearer for which the optical lens has been designed.

In the context of the invention, the optical lens data OLD can comprise a first set of optical lens data related to the first part (for example the first equation EF1) and a second set of optical lens data related to the second part (for example the second equation EF2).

Thus, in a particular embodiment, the networked data-processing device DPD is arranged to receive the third set of data S3 comprising, the first and second sets of optical lens data (OLD1; OLD2). The networked data-processing device DPD is further arranged to encrypt at least one of the first (VF1 or EF1) and second (VF2 or EF2) sets of optical lens data by means of encrypting means ENCRM and an encryption key ENCR.

The networked data-processing device DPD finally builds the fourth set of data S4 comprising at least the optical lens data at least partially encrypted CRP(OLD). In an alternative embodiment, the fourth set of data S4 can further comprise a set of manufacturing rules to be used with a specific machine set located at the manufacturing side to manufacture the optical lens defined by the optical lens data OLD. The manufacturing rules can be related more particularly to appropriate tools or parameters to be used for machining the optical lens (surfacing, polishing, edging, or other).

The third computer entity PC3 comprises then decrypting means for decrypting the fourth set of data S4 with a decryption key DECR. Based on the fourth set of data S4, the optical lab at the manufacturing side is thus able to manufacture the optical lens according to the lens order.

An optical lens order identifier #ID can be included in each data set S1, . . . , S4 (or at least in the first and fourth sets) so as to store at the lens manufacturing side (LMS) (for example in a memory of the third computer entity PC3) data of the fourth set with a link to the lens order identifier #ID.

The networked data-processing device DPD can further include means for running a website associated to the server SER, to provide an interface easy to use for the eye care professionals and/or for the optical labs. For example, the first set of data S1 can be transmitted to a portal page of the website and the fourth set S4 can be received also trough such an interface.

Therefore, according to an advantage of the invention, a networked computer entity (called here-above "third computer entity") located for example at a manufacturing side can be provided with optical lens data calculated by at least one networked computer entity (called here-above "second computer entity") located at a lens designing side.

The eye care professional (and/or a person from the optical lab) may prefer to select an optical lens design among a plurality of choices provided by different lens designers, each lens designer having its own lens product specification and/or his own lens design recommendation, or other. It is thus more convenient for the eye care professional (or for the optical lab) to compare and to select finally an optical lens design which fits the best the lens order.

The present invention advantageously provides a networked data-processing device comprising, for example, a server (and possibly processing means for running a website and a database), to which the third computer entity PC3 (at the manufacturing side) and/or a computer entity at an ordering side (called here-above "first computer entity") can be connected through a network in order to be provided with optical lens data possibly from different lens designers. An eye care professional and/or an optical lab can thus choose on-line an optical lens for example in a virtual catalogue showing a multiplicity of possible lenses.

In an embodiment, the third computer entity can be the same entity as the first computer entity, if the ordering side and the manufacturing side are a same side.

In order to facilitate the manufacture of the optical lenses, at the manufacturing side, the optical lab can send the whole set of data comprising the wearer's data, the frames data, or other, to the second computer entity (at the lens designing side) and the second computer entity may, for example, perform a calculation of a lens design adapted to the wearer's data, spectacle frame data, but also possibly according to particular lens product specification data. Then, the second computer entity sends to the third computer entity (at the manufacturing side) optical lens data which may include for example a calculation of an adapted lens design data.

However, the optical lens data or an optical lens specification of a lens designer and/or lens provider can be private and confidential data. It is thus not wished to share such data with other parties like, for example, other lens designers/providers.

According to an advantage of the invention, it is proposed thus to secure at least the optical lens data received from the lens designing side.

In a particular embodiment, each transmission of a fourth set of data S4 performed by the networked data-processing device PDP is counted by a counting means that the networked data-processing device comprises, so as to obtain an amount value AV which can be stored for example in the memory MEM (FIG. 1). In a complementary or alternative embodiment, each encryption of at least a part of the third set of data S3 can be counted by counting means so as to obtain the amount value AV. For example, an initial amount can be assigned to the third computer entity PC3 (or more generally to an optical lab) and that amount can be decremented by the networked data-processing device DPD at each transmission or encryption. For example, a token giving a right to an optical lab or to an eye care professional running the third computer entity PC3 to access to N optical lens design data transmitted by the networked data-processing device DPD can be decremented at each transmission of such data from the networked data-processing device, or at each encryption performed by the device DPD for the third computer entity PC3. In an alternative embodiment, lens designers can assign tokens to the networked data-processing device DPD, each token giving a right to access for example to N optical lens design data provided by a same lens designer. The token value N can therefore be decremented at each transmission of such data from the device DPD, or at each encryption performed by the networked data-processing device DPD.

Moreover, an accounting treatment can be performed at each transmission of a fourth set of data S4 and/or at each encryption on the basis of records stored in memory MEM (for example for billing purpose).

Referring to FIG. 3, the memory MEM of the networked data-processing device DPD can store each amount value AV1, AV2, AV3, etc. of respective manufacturing labs identified by an identifier #lab1, #lab2, #lab3, etc. In an alternative or complementary embodiment, amount values can be associated to a respective manufacturing lab and/or to a lens design calculation engine ENG 1, ENG 2, . . . , ENG I. For example, several amount values AV1-1, AV1-2, . . . , AV1-I, can be associated respectively to:

- to a given optical lab (having here an identifier #lab1), and
- to a calculation engine ENG 1, ENG 2, . . . , ENG I, that provided the optical lens data OLD finally sent to that lab (#lab1).

In a further embodiment in which the optical lens data OLD comprise optical lens design data provided by a calculation engine ENG 1, ENG 2, . . . , ENG I, the amount values can be associated to a lens design type. For example, several amount values AV1-1-*a*, AV1-1-*b*, AV1-1-*c*, . . . , AV1-2-*a*', AV1-2-*b*', AV1-2-*c*', . . . , AV1-I-a", AV1-I-b", AV1-I-c", . . . , can be associated respectively:

- to a given optical lab (having here an identifier #lab1),
- to a calculation engine ENG 1, ENG 2, . . . , ENG I, providing the optical lens data OLD, and/or
- to lens design types (a, b, c, etc., associated to lens design data calculated by the calculation engine ENG 1-*a', b', c'* etc., associated to lens design data calculated by the calculation engine ENG 2-*a", b", c"* etc., associated to lens design data calculated by the calculation engine ENG I).

In a particular embodiment, a general encryption key ENCR1, ENCR2, ENCR3, etc. is provided to each lab (#lab1, #lab2, #lab3, etc.) and such an encryption key can evolve at each modification of the amount value AV1, AV2, AV3, etc. assigned to that lab (each time for example the amount value presented above is decremented). This embodiment can be performed with so-called "diversified keys" in symmetric cryptography. At the lens manufacturing side (right part of FIG. 3), the third computer entity PC3 can store also its amount value AV1, decremented for example at each time a fourth set of data S4 is received from the networked data-processing device DPD) and a decryption key DECR1(*i*) can evolve accordingly.

Of course, in an alternative embodiment, an independent encryption key can be used at each encryption of optical lens data. Moreover, an asymmetric cryptographic mode can be used as an alternative to a symmetric mode presented above.

In an alternative or complementary embodiment, the optical lens can be seen, as described above, as comprising a first part F1 and a second part F2. The optical lens data OLD comprise then a first set of optical lens data OLD1 related to the first part F1 and a second set of optical lens data OLD2 related to the second part F2. The first set of optical lens data OLD1 and the second set of optical lens data OLD2 define together the optical function OF of the optical lens described above.

Then, a masking function is applied:

to the first set of optical lens data OLD1 so as to obtain a first modified set of optical lens data MOLD1, and to the second set of optical lens data OLD2 so as to obtain a second modified set of optical lens data MOLD2.

The masking function is chosen in particular so as the first modified set of optical lens data MOLD1 and the second modified set of optical lens data MOLD2 define together a same optical function than the optical function OF of the optical lens.

Therefore, the lens manufacturing side LMS (for example an optical lab receiving the fourth set of data S4) is unable to determine the genuine optical lens data OLD and more particularly the first set of optical lens data OLD1 and the second set of optical lens data OLD2. In fact, only modified data MOLD1 and MOLD2 are given here to the lens manufacturing side.

More generally, the modified data MOLD1 and MOLD2 can be transmitted to several manufacturing sides. In the example of embodiment shown in FIG. 4, a fourth networked computer entity PC4 is at a semi-finished lens manufacturing side SFLMS. The first modified set of optical lens data MOLD1 can be sent thus to the third networked computer entity PC3 at the lens manufacturing side LMS whereas the second modified set of optical lens data MOLD2 is sent to the fourth networked computer entity PC4 located at the semi-finished lens manufacturing side SFLMS.

The whole optical lens data can thus be kept secret since a first lab (LMS) only has a first part of the data MOLD1 and that first part F1 is modified, while the other lab (SFLMS) has also only a second part of the data MOLD2 and that second part is also modified.

The masking function which can be applied to the data OLD1 can be for example an operation with a secret value and a corresponding reverse operation can be applied to the data OLD2. For example, a convolution by a first optical transfer function can be applied to the data OLD1 and a convolution by a second optical transfer function can be applied to the data OLD2, the second optical transfer function being for example the inverse of the first optical transfer function. The first optical transfer function can be generated by means for generating pseudo-random parameters of the first optical transfer function (randomly drawn at each transmission of fourth data set S4, for example). Therefore, the lens manufacturing side cannot easily determine the genuine optical lens data OLD or OLD1 corresponding for example to particular wearer's prescription data. Moreover, the pseudo-random parameters can be selected (among several drawings for example) so as to minimise the impact of the application of the optical transfer functions on the geometrical properties of the optical lens.

The modified data thus obtained MOLD1 and MOLD2 can furthermore be encrypted before their transmissions respectively to the sides LMS and SFLMS. The modification of the data OLD1 and OLD2 can be performed by the second networked computer entity PC2 at the lens designing side LDS or by the networked data-processing device DPD.

For example, the encrypted second modified set of optical lens data MOLD2 (if it is related for example to the front face of the optical lens) can be sent to a semi-finished lens manufacturing lab (SFLMS), which sends the semi-finished lens which has been machined according to the data MOLD2 to the lens manufacturing lab (LMS). The encrypted first modified set of optical lens data MOLD1 (if it is related then to the back face of the optical lens) can be sent to the lens manufacturing side LMS where the optical lab can finish the manufacture of the optical lens according to the data MOLD1.

The networked data-processing device DPD can further comprise means for adapting data structures of the second data set S2 and/or data structures of the fourth data set S4 (for example file formats or data communication message format) for each computer entity PC2, PC3 (and/or PC1) before sending these data sets. Such adapting means enable thus a translation between possible different formats.

Moreover, the networked data-processing device DPD can further send the second sets of data S2 to several second computer entities PC2, and may select for example (among different third sets of data S3 sent in response to the second set S2) optical lens data which fits the best one or several criteria (price, availability, or other), for building the fourth set of data S4 to send at the lens manufacturing side LMS.

Of course, other embodiments are possible and the invention is not limited to the embodiments presented above by way of examples.

For example, referring to FIG. 5A, the optical lens data S4 can be sent to the eye care professional so that the eye care professional can check whether the optical lens can fully fit wearer's data, spectacle frame data, etc., or other criteria such as the cost of the optical lens, an optical comfort, or other. If the eye care professional is satisfied with the lens design, the first networked computer entity PC1 can send a validation message OK1 to the networked data-processing device DPD, which then decrements the amount value AV. The first networked computer entity PC1 sends furthermore another validation message OK2 to the third networked computer entity PC3, so as to start the machining of the optical lens.

In the alternative embodiment illustrated in FIG. 5B, if the eye care professional is satisfied with the lens design, the first networked computer entity PC1 sends a first validation message OK1 to the third networked computer entity PC3. The third networked computer entity PC3 transmits accordingly a second validation message OK2 to the networked data-processing device DPD, which then decrements the amount value AV.

Of course, the possibility to choose on the website a lens design is not offered only to eye care professionals and/or optical labs. For example, the final user (typically the wearer) can choose also a lens design according to his or her preference, for example using a networked personnel computer or any other terminal, such as a mobile phone (a smartphone, and the like).

The invention claimed is:

1. A method implemented by a processor through a network, for providing at least one optical lens adapted to a wearer, the optical lens comprising a first part and a second part, the method comprising the steps of:

a) receiving, directly or indirectly via a manufacturing lab, from a first networked computer entity (PC1; PC3) located at a lens ordering side (LOS), a first set of data (S1), the first set of data (S1) comprising at least wearer's data and in particular wearer's prescription data, b) sending a second set of data (S2) comprising at least an optical lens design information and the wearer's prescription data to a second networked computer entity (PC2) located at a lens designing side (LDS), and receiving from the second networked computer entity (PC2) a third set of data (S3) comprising at least optical lens data (OLD) calculated from the second set (S2), wherein the optical lens data (OLD) comprises a first set of optical lens data (OLD1) related to the first lens part and a second set of optical lens data (OLD2) related to the second lens part, the first set of optical lens data (OLD1) and the second set of optical lens data (OLD2) defining together an optical function (OF) of the optical lens, wherein the optical function (OF) of the optical lens defines optical and geometrical properties of the optical lens;

c) sending at least to a third networked computer entity (PC3), at a lens manufacturing lab (LMS), at least the first set of optical lens data (OLD1);

d) sending at least to a fourth networked computer entity (PC4), at a semi-finished lens manufacturing lab (SFLMS), at least the second set of optical lens data (OLD2), the first set of optical lens data (OLD1) and the second set of optical lens data (OLD2) defining together the optical function;

wherein the at least first and second optical lens data (OLD1, OLD2) are each at least partially modified by a masking function (ENCR; MOLD1, MOLD2) and wherein a masking function is applied to:

the first set of optical lens data so as to obtain a first modified set of optical lens data (MOLD1), and to the second set of optical lens data so as to obtain a second modified set of optical lens data (MOLD2), the first modified set of optical lens data (MOLD1) and the second modified set of optical lens data (MOLD2) defining together a same optical function as said optical function (OF) of the optical lens, and said optical lens are manufactured at the semi-finished lens manufacturing lab (SFLMS) and at the lens manufacturing lab (LMS) using the first modified set of optical lens data (MOLD1) and the second modified set of optical lens data (MOLD2) that together define the same optical function as said optical function (OF) of the optical lens.

2. The method according to claim 1, wherein each implementation of step c) is counted by a counting means so as to obtain an amount value (AV).

3. The method according to claim 2, wherein a token value, associated to the third networked computer entity (PC3) and/or to the second networked computer entity (PC2), is decremented at each counting.

4. The method according to claim 2, wherein an accounting treatment is performed on the basis of the amount value (AV).

5. The method according to claim 1, wherein the masking function comprises an encryption and the first and second optical lens data (OLD1, OLD2) are at least partially encrypted by encryption means and an encryption key (ENCR), and the third and fourth networked computer entities (PC3, PC4) are arranged to decrypt the optical lens data (OLD1, OLD2) with a decryption key (DECR).

6. The method according to claim 5, wherein the encryption of the optical lens data results from an encryption of at least a part of the third set of data (S3) performed at step c), and each encryption performed at step c) is counted by a counting means so as to obtain an amount value (AV).

7. The method according to claim 6, wherein at least one encryption key (ENCR1(*i*), ENCR2(*j*), ENCR3(*k*)) is provided in association to each amount value (AV1, AV2, AV3).

8. The method according to claim 1, wherein steps a) to d) are performed by a networked data-processing device (DPD) comprising at least a server (SER) and a storage unit (MEM).

9. The method according to claim 8, wherein at least the first set of data (S1) is transmitted to a website run by the networked data-processing device (DPD).

10. The method according to claim 1, wherein the first set of optical lens data (OLD1) further comprises a set of manufacturing rules being associated to optical lens data (OLD).

11. An optical lens supply system for providing, through a network, at least one optical lens adapted to a wearer, the optical lens comprising a first part and a second part, the system comprising a processor (DPD) for:

a) receiving, directly or indirectly via a manufacturing lab, from a first networked computer entity (PC1; PC3) located at a lens ordering side (LOS), a first set of data (S1), the first set of data (S1) comprising at least wearer's data and in particular wearer's prescription data, b) sending a second set of data (S2) comprising at least an optical lens design information and the wearer's prescription data to a second networked computer entity (PC2) located at a lens designing side (LDS), and receiving from the second networked computer entity (PC2) a third set of data (S3) comprising at least optical lens data (OLD) calculated from the second set (S2), wherein the optical lens data (OLD) comprises a first set of optical lens data (OLD1) related to the first lens part and a second set of optical lens data (OLD2) related to the second lens part, the first set of optical lens data (OLD1) and the second set of optical lens data (OLD2) defining together a optical function (OF) of the optical lens, wherein the optical function (OF) of the optical lens defines optical and geometrical properties of the optical lens;

c) sending at least to a third networked computer entity (PC3), at a lens manufacturing lab (LMS), at least the first set of optical lens data (OLD1), d) sending at least to a fourth networked computer entity (PC4), at a semi-finished lens manufacturing lab (SFLMS), at least the second set of optical lens data (OLD2) the first set of optical lens data (OLD1) and the second set of optical lens data (OLD2) defining together the optical function;

wherein the at least first and second optical lens data (OLD1, OLD2) are each at least partially modified by a masking function (ENCR; MOLD1, MOLD2) and wherein a masking function is applied to:

the first set of optical lens data so as to obtain a first modified set of optical lens data (MOLD1), and to the second set of optical lens data so as to obtain a second modified set of optical lens data (MOLD2), the first modified set of optical lens data (MOLD1) and the second modified set of optical lens data (MOLD2) defining together a same optical function as said optical function (OF) of the optical lens, and said optical lens are manufactured at the semi-finished lens manufacturing lab (SFLMS) and at the lens manufacturing lab (LMS) using the first modified set of optical lens data (MOLD1) and the second modified set of optical lens data (MOLD2) that together define the same optical function as said optical function (OF) of the optical lens.

12. A non-transitory computer-readable storage medium with an executable program stored thereon, wherein the program instructs a microprocessor to perform the steps of the method defined in claim 1 through a network.

13. The method according to claim 3, wherein an accounting treatment is performed on the basis of the amount value (AV) through a network.

* * * * *